United States Patent [19]

Reyer et al.

[11] Patent Number: 4,624,730

[45] Date of Patent: Nov. 25, 1986

[54] PORTABLE HOT-PRESS FOR THERMOWELDING MARKED AND/OR PRINTED FOILS OF THERMOPLASTIC SYNTHETIC MATERIAL

[75] Inventors: Manfred Reyer; Klaus Schmidts, both of Dortmund, Fed. Rep. of Germany

[73] Assignee: Hoesch Maschinenfabrik Deutschland AG, Dortmund, Fed. Rep. of Germany

[21] Appl. No.: 641,367

[22] Filed: Aug. 16, 1984

[30] Foreign Application Priority Data

Aug. 14, 1981 [DE] Fed. Rep. of Germany ... 8123877[U]

[51] Int. Cl.[4] .......................... B30B 1/18; B30B 15/34
[52] U.S. Cl. .................................. 156/358; 100/93 P;
100/219; 100/290; 156/498; 156/583.1;
156/583.7
[58] Field of Search ............... 156/583.1, 583.6, 583.7,
156/498, 358; 100/93 P, 290, 219, 231, 256

[56] References Cited

U.S. PATENT DOCUMENTS

| | | | |
|---|---|---|---|
| 1,305,783 | 6/1919 | Dunlap | 100/290 |
| 1,563,684 | 12/1925 | Black | 100/290 |
| 1,870,517 | 8/1932 | Lacey | 100/93 P |
| 2,160,805 | 6/1939 | Winegar | 100/93 P |
| 3,055,224 | 9/1962 | MacGeorge | 100/290 |
| 3,527,161 | 9/1970 | Brown et al. | 100/290 |
| 3,788,211 | 1/1974 | Mason, Jr. | 100/290 |
| 4,369,084 | 1/1983 | Lisec | 156/580 |

*Primary Examiner*—Michael Wityshyn
*Attorney, Agent, or Firm*—Max Fogiel

[57] ABSTRACT

A portable hot-press for thermowelding marked and/or printed foils of thermoplastic synthetic material, particularly PVC, to produce single-sheet identification cards. There are provided a press drive, two heating plates, one fixed and one sliding cross bar on the press and a fan for cooling the heating plates and thermowelded foils. Two screw elevating gears, driven by a gearmotor are provided to guide and move the cross bar of the press. The gearmotor may have a retaining brake.

2 Claims, 5 Drawing Figures

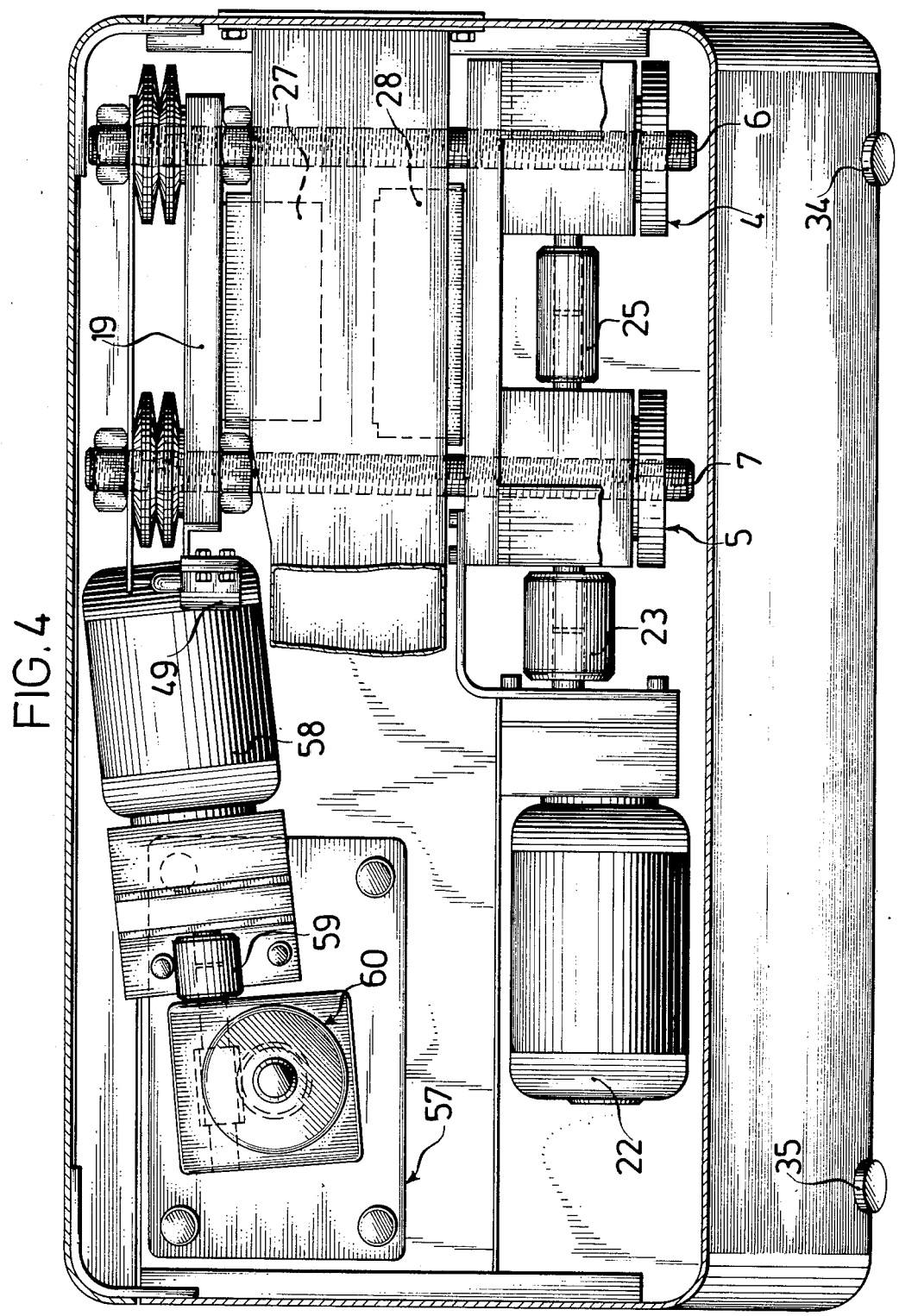

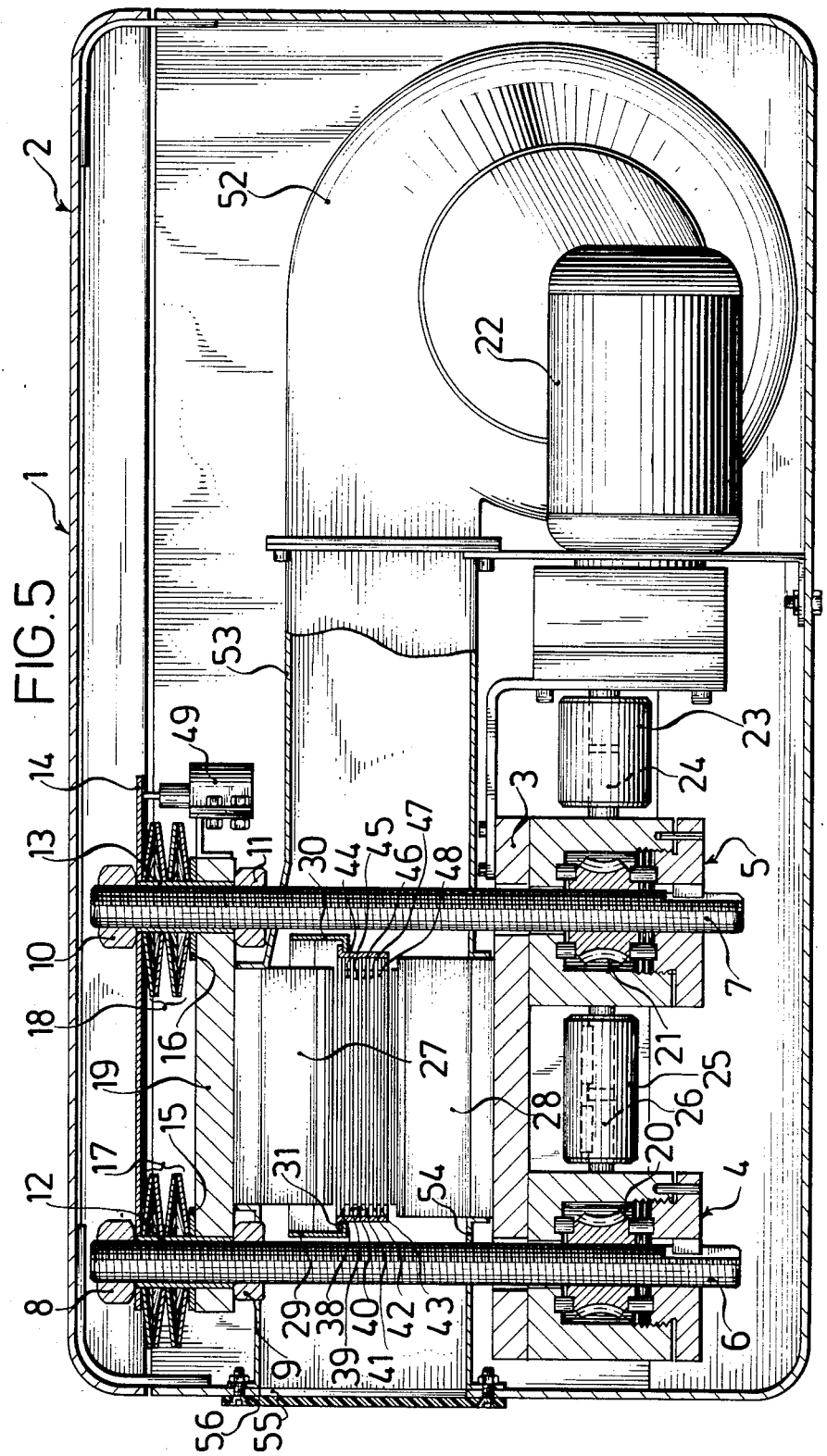

4,624,730

PORTABLE HOT-PRESS FOR THERMOWELDING MARKED AND/OR PRINTED FOILS OF THERMOPLASTIC SYNTHETIC MATERIAL

BACKGROUND OF THE INVENTION

The novel feature of the present invention is that it relates to a portable hot-press for thermowelding marked and/or printed foils of thermoplastic synthetic material, particularly PVC, to produce single-sheet identification cards. It includes a press drive, one fixed and one sliding cross bar of the press, and a fan for cooling the heating plates and the thermowelded foils. A hot-press of the kind mentioned, as it is known e.g. from German Utility Patent DE-GM No. 80 11 833, has a press stand with a fixed and a sliding cross bar to take the two heating plates. The sliding cross bar of the press is moved by a hydraulic cylinder, located centrally relative to four guide columns.

It was found that, when such a hot-press is in use, the sliding bar of the press tends to catch and become jammed if the state of friction between the four guide columns and the cross bar changes in an uneven manner.

However, since the state of friction with the respective guide columns does not remain constant over an extended period of operation, the sliding cross bar will again and again catch against the guide columns and become jammed, resulting in failure of the hot-press.

SUMMARY OF THE INVENTION

The novel feature of the present invention serves to make a hot-press of the kind mentioned operate in such a manner as to make it impossible for the sliding cross bar of the press to catch against its guide elements.

This is achieved by providing two screw elevating gears, driven by a gear motor, to move and to guide the sliding cross bar of the press.

It is another novel feature of the present invention that the gearmotor is fitted with a retaining brake. Preferably, each screw elevating gear has ballscrew-type elevating screws.

Two sets of cup springs are inserted between the screw elevating gears and the sliding cross bar of the press. A limit switch which when the cup springs are compressed, switches off the gearmotor, is fitted to the sliding cross bar of the press.

If these novel features are included in a hot-press of this kind, it is possible to arrange the heating plates to be placed in a tilted position which allows the hot-press to be fed in a particularly convenient manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 shows a section, corresponding to Line IV—IV in FIG. 3;

FIG. 5 shows a section, corresponding to Line V—V in FIG. 2.

DESCRIPTION OF THE PREFERRED EMBODIMENTS

Figure 1:
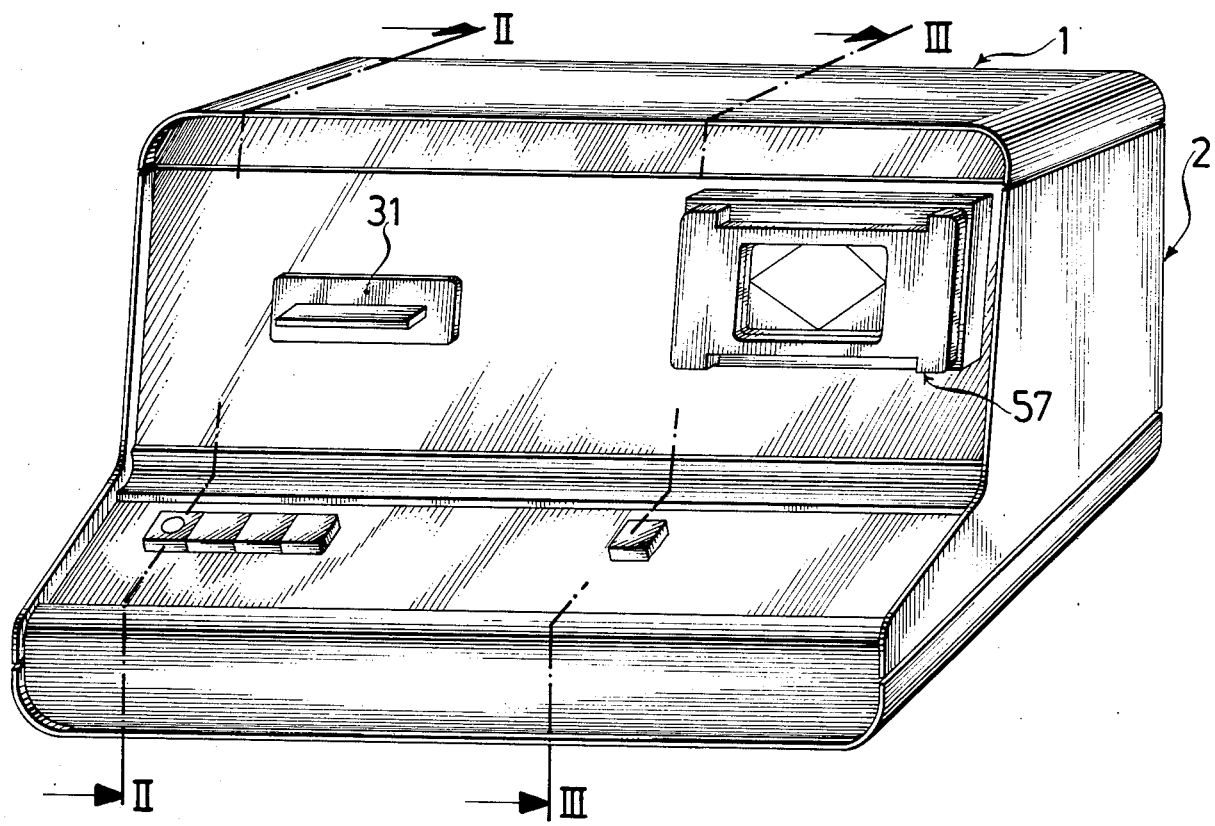
FIG. 1 shows, in perspective, a hot-press with a punch-cutter for the identification cards.
Figure 2:
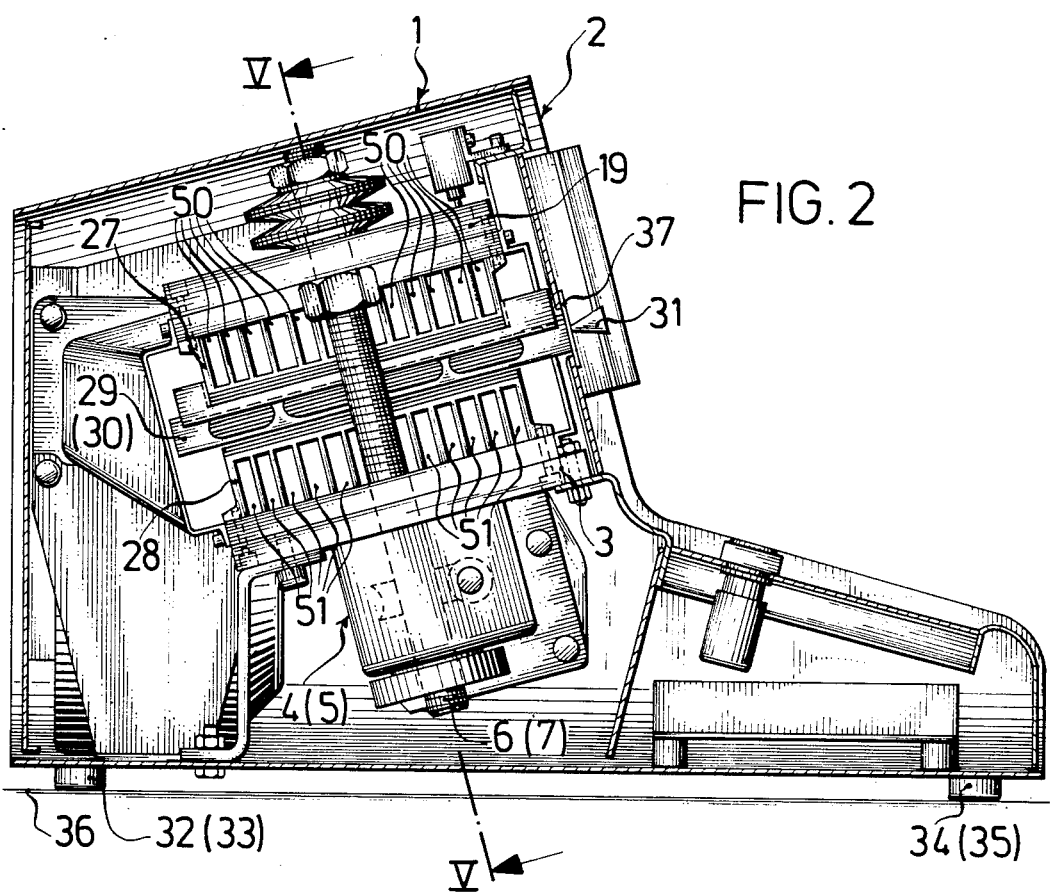
FIG. 2 shows a section, corresponding to Line II—II in FIG. 1.
Figure 3:
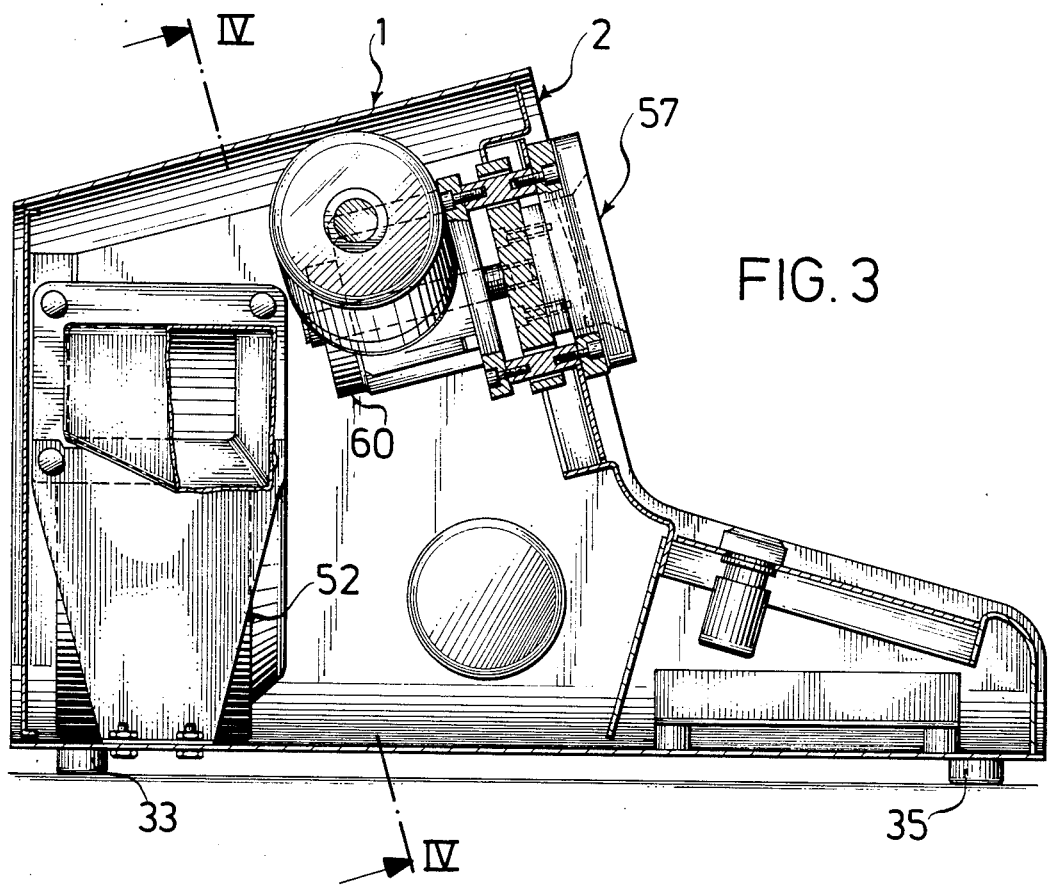
FIG. 3 shows a section, corresponding to Line III-—III in FIG. 1.

A hot-press 1 has a cabinet 2 suitable for being carried, such as is used for office machines. The hot-press has, screwed to a fixed cross bar 3, two screw elevating gears 4, 5, the elevating screws 6, 7 of which act on a sliding cross bar 19 through four threaded nuts 8, 9, 10, 11, two guide and spacer bushes 12, 13, a shackle 14, two washers 15, 16 and two sets of cup springs 17, 18.

The elevating screws 6, 7 are ballscrews. Both screw elevating gears 4, 5 contain a worm gear 20, 21 each. A gearmotor 22 drives the worm shaft 26 of the worm gear 20 through a coupling 25. The interior of the gearmotor 22 is fitted with a retaining brake (not shown).

There is an electrically heated heating plate 27, 28 to each cross bar 3, 19 of the press. On the heating plate 27, there are two guide ledges 29, 30 for guiding the feeding tray 31.

The screw elevating gears 4, 5, the cross bars 3, 19 of the press, the heating plates 27, 28 and the guide ledges 29, 30 are placed inclined at an angle of 15° to the plane 36 formed by the feet 32, 33, 34, 35 of the cabinet.

The inclined position of the heating plates 27, 28 and the guide ledges 29, 30 brings about that the feed tray can, by gravity, slide automatically on the guide ledges 29, 30 up to a stop 37. The feed tray 31 is designed to take six backing plates 38, 39, 40, 41, 42, 43 of metal and five stacks 44, 45, 46, 47, 48 of four plastic foils each measuring 115 mm × 80 mm. Two each of the four plastic foils in a stack 44, 45, 46, 47, 48 are marked or printed.

A limit switch 49 fixed to the cross bar 19 switches off the gearmotor 22 as soon as the cup springs 17, 18 are compressed by the press force exerted.

The separate stacks 44, 45, 46, 47, 48 of four plastic foils each are simultaneously thermowelded between the heating plates 27, 28 by heat being supplied, while the press force remains almost constant. In order to cool the five single-sheet indentification cards as quickly as possible, the heating plates 27, 28 which are fitted with cooling channels 50, 51 are cooled down.

Air, blown by a fan 52 through a socket 53 to the heating plates 27, 28, is used as cooling medium. The warmed cooling air is expelled through a socket 54, an outlet 55 and a grid 56 screwed to the cabinet 2 to the outside.

After cooling, the five single-sheet identification cards are separately trimmed to size 85 mm × 53 mm by the punch-cutter 57.

A gearmotor 58, driving a screw elevating gear 60 through a coupling 59 actuates the lifting movement of the punch-cutter 57.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Portable hot-press for thermowelding marked and/or printed foils of thermoplastic synthetic material to produce single-sheet identification cards consisting only of two heating plates; one fixed and one sliding cross bar on the press and a fan for cooling said heating plates and thermowelded foils; only two screw elevating gears driven by a gearmotor for guiding and moving the sliding cross bar of the press; said two screw elevating gears being screwed to said fixed cross bar and actuating said sliding cross bar; said gear motor having a retaining brake; each screw elevating gear having only one ballscrew-type elevating screw; each screw elevating gear having only one elevating screw; two sets of cup springs mounted on said elevating screws; a limit switch for the gear motor and mounted on the sliding cross bar of the press, said cup springs operating in conjunction with said limit switch, said cup springs being compressed dependent upon the position of said limit switch, said limit switch switching off said gear motor when said cup springs are compressed by an applied press force; said elevating gears having each a worm gear with a worm shaft, said gear motor driving said worm shaft through a coupling, said gear motor having an interior holding said retaining brake; said heating plates having guide ledges for guiding a feeding tray; said screw elevating gears, fixed and sliding cross bars, heating plates and guide ledges being inclined at an angle of substantially 15° to the plane formed by feet of a housing, so that said feed tray can slide by gravity automatically on said guide ledges up to a stop; separate stacks of plastic foils being each simultaneously thermowelded between said heating plates while the applied press force remains substantially constant, so that jamming of the sliding cross bar during motion is prevented.

2. Hot-press as defined in claim 1, wherein said synthetic material comprises PVC.

* * * * *